United States Patent [19]

Takahashi

[11] Patent Number: 4,999,725
[45] Date of Patent: Mar. 12, 1991

[54] READ/WRITE HEAD CARRYING MECHANISM FOR FLOPPY DISK DRIVE

[75] Inventor: Shoji Takahashi, Hannou, Japan

[73] Assignee: Citizen Watch Co., Ltd., Tokyo, Japan

[21] Appl. No.: 383,411

[22] Filed: Jul. 20, 1989

[30] Foreign Application Priority Data

Jul. 29, 1988 [JP] Japan .................................. 63-190860
Jul. 29, 1988 [JP] Japan .................................. 63-190859

[51] Int. Cl.$^5$ ............................ G11B 5/54; G11B 5/55
[52] U.S. Cl. .................................. 360/105; 360/106
[58] Field of Search ............................ 360/104–107, 360/109

[56] References Cited

U.S. PATENT DOCUMENTS

| 4,392,165 | 7/1983 | Wright | 360/105 |
| 4,858,046 | 8/1989 | Maeda | 360/106 |

FOREIGN PATENT DOCUMENTS

| 0167781 | 1/1986 | European Pat. Off. | |
| 0077027 | 6/1980 | Japan | 360/105 |
| 0020186 | 1/1987 | Japan | 360/105 |
| 2178219 | 2/1987 | United Kingdom | 360/105 |

OTHER PUBLICATIONS

Patent Abstracts of Japan, vol. 7, No. 54, 57-200971, Hitachi.
Patent Abstracts of Japan, vol. 9, No. 141, 60-20368, Matsushita.
Patent Abstracts of Japan, vol. 8, No. 133, 59-36371, Mitsubishi.

Primary Examiner—A. J. Heinz
Assistant Examiner—Jefferson Evans
Attorney, Agent, or Firm—Koda and Androlia

[57] ABSTRACT

A read/write head carrying mechanism for a floppy disk drive. Upper and lower heads are brought into close contact with both sides of a floppy disk in a loaded state, and reciprocate in the radial direction of the floppy disk so as to be positioned at a desired track. The lower head is secured to a carriage, while the upper head to an upper arm, which is swingable with respect to the carriage. The carriage reciprocates along a single guide rail, which is spaced apart from and disposed parallel with a head moving path. The carriage is supported by the single guide rail, with the result that the carriage and the upper arm as a whole form a carriage assembly which swings with the guide rail as a fulcrum. The upper and lower heads move vertically by very small amounts by following the fluctuation of the floppy disk, thereby causing the heads and the floppy disk to be brought into close contact with each other.

12 Claims, 3 Drawing Sheets ly mounted carriage whose longitudinal axis extends in the direction of the aforementioned head moving path, and the longitudinal axis of the carriage is arranged to be in alignment with the head moving path, the carriage being reciprocated by a motor or the like.
READ/WRITE HEAD CARRYING MECHANISM FOR FLOPPY DISK DRIVE

BACKGROUND OF THE INVENTION

The present invention relates to a read/write head carrying mechanism for a floppy disk drive. More particularly, the present invention concerns improvements of a read/write head carrying mechanism which is adapted to bring upper and lower heads, respectively, into close contact with both sides of a floppy disk placed in a loaded position, cause the upper and lower heads reciprocate along a predetermined head moving path, and swing open the upper and lower heads away from each other during the loading or unloading of the floppy disk, thereby facilitating the insertion and ejection of a disk cartridge.

Hitherto, various types of floppy disk drives have been put to practical use so as to effect the reading/writing of information in a magnetic medium known as a floppy disk, particularly a 3.5-inch floppy disk, incorporated in a disk cartridge.

Among these types of floppy disk drives, a double head type having a pair of upper and lower heads and capable of effecting the reading/writing of information on both sides of a floppy disk has been a mainstream, and these upper and lower heads are reciprocated along a predetermined head moving path set in the radial direction of the floppy disk.

A typical floppy disk drive employs a longitudinally mounted carriage whose longitudinal axis extends in the direction of the aforementioned head moving path, and the longitudinal axis of the carriage is arranged to be in alignment with the head moving path, the carriage being reciprocated by a motor or the like.

In addition to such a longitudinally mounted carriage, a transversely mounted carriage whose longitudinal axis is arranged perpendicularly to a head moving path has also been proposed, and these two different types of carriages are used each in its proper way, as required.

In both of these types, however, a space must be secured for the upper and lower heads to permit the insertion or removal of a disk cartridge during the loading or unloading of the disk cartridge. Conventionally, either one of the heads, normally the upper head, is swung open upwardly, and the insertion and removal of the disk cartridge are carried out through a clearance formed thereby.

Hence, with a conventional apparatus, there has been a problem in that the thickness of the floppy disk drive increases for securing a space for the springing up of the upper head.

A floppy disk drive having such a large thickness has a drawback in that it is unable to cope with the trend toward a small thickness which computers have in recent years have been required to be provided.

SUMMARY OF THE INVENTION

Accordingly, an object of the present invention is to provide an improved read/write head carrying mechanism which allows the thickness of a floppy disk drive to be small and makes it possible to decrease the amount of movement of a carrier, accommodating a disk cartridge, between a loading position and an unloading position, thereby overcoming the above-described drawbacks of the conventional art.

To this end, in accordance with the present invention, there is provided a read/write head carrying mechanism of a transversely mounted type in which a single guide rail is secured to a frame at a position spaced apart a predetermined distance from and parallel with a head moving path set in the radial direction of a floppy disk, and a carriage is slidably and swingably supported by the guide rail.

An upper arm is swingably supported by the carriage, and a lower head and an upper head are respectively secured to the carriage and the upper arm.

The carriage and the upper arm are respectively disposed on the lower and upper sides of the carrier, the carriage being adapted to be pushed upwardly by a pushup portion provided on the carrier. When the carrier moves upwardly from a loading position to an unloading position, the upper arm is swung open upwardly, and, at the same time, the carriage is swung open downwardly.

In accordance with the present invention, the carriage and the upper arm form a carriage assembly, and this carriage assembly is pivotally supported by the single guide rail. The carriage assembly is provided with a substantially uniform weight balance between the left- and right-hand sides of the guide rail serving as a swinging shaft. For this reason, at the time of the swinging open of the upper arm and the carriage as well as during a read/write operation, a stable swinging operation is ensured.

Accordingly, in accordance with the present invention, the carrier moves vertically during the loading or unloading of a disk cartridge, the upper arm is swung open upwardly and the carriage downwardly simultaneously with the vertical movement of the carrier from the loading position to the unloading position. Thus, by virtue of this double swinging-open action, it becomes possible to secure a sufficient space for movement of the heads so as to load or unload a disk cartridge.

In addition, in accordance with the present invention, since not only the upper arm but also the carriage effects an opening operation, the required amount of movement of the carrier between the loading position and the unloading position can be made smaller than with the conventional apparatus, so that a mechanism for driving the carrier can be arrange more simply.

Furthermore, as described above, since the carriage assembly in accordance with the present invention has a substantially uniform weight balance between the left- and right-hand sides of the guide rail serving as a swinging shaft, the opening operation can be effected with a stable balance when the upper arm is swung open upwardly and the carriage downwardly. In addition, there is another advantage in that, even if a carriage assembly swingable by means of a single guide rail is used, it is possible for heads attached to the carriage assembly to maintain stable postures during a usual read/write operation, since there is virtually no imbalance in the weight during the movement of the carriage.

The above and other objects, features and advantages of the present invention will become more apparent from the following detailed description of the invention when read in conjunction with the accompanying drawings

DESCRIPTION OF THE PREFERRED EMBODIMENT

Referring now to the accompanying drawings, a description will be given to a preferred embodiment of the present invention.

Figure 1:
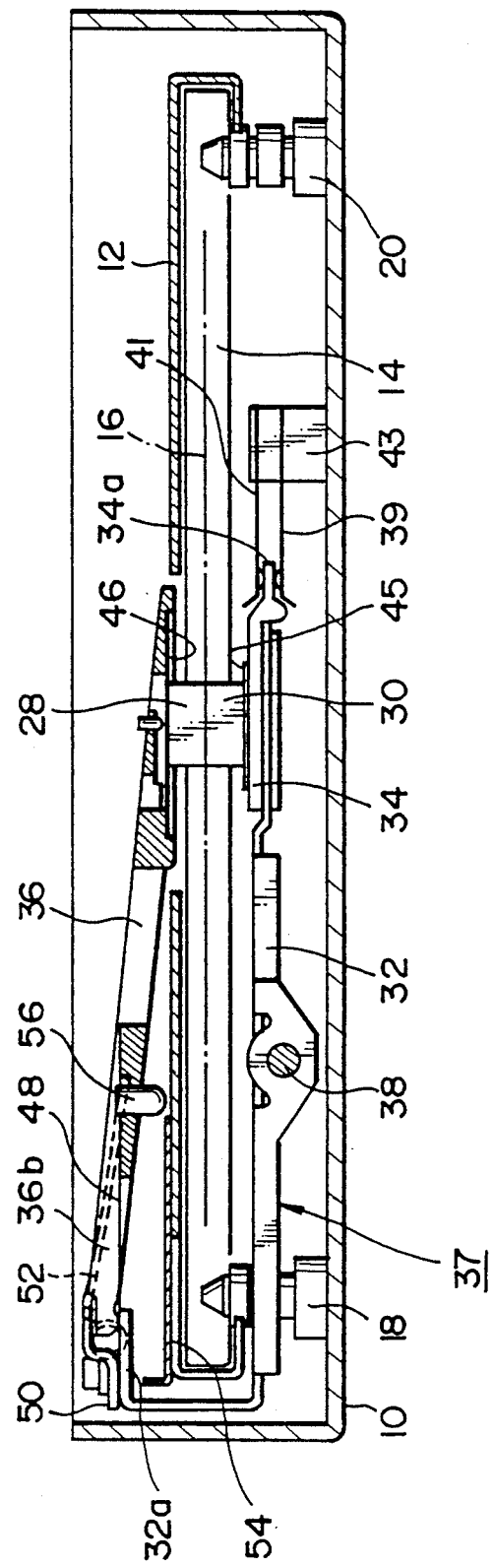
FIG. 1 is a cross-sectional view of an essential section of a read/write head carrying mechanism incorporated in a floppy disk drive, illustrating a loaded state in accordance with an embodiment of the present invention.
Figure 2:
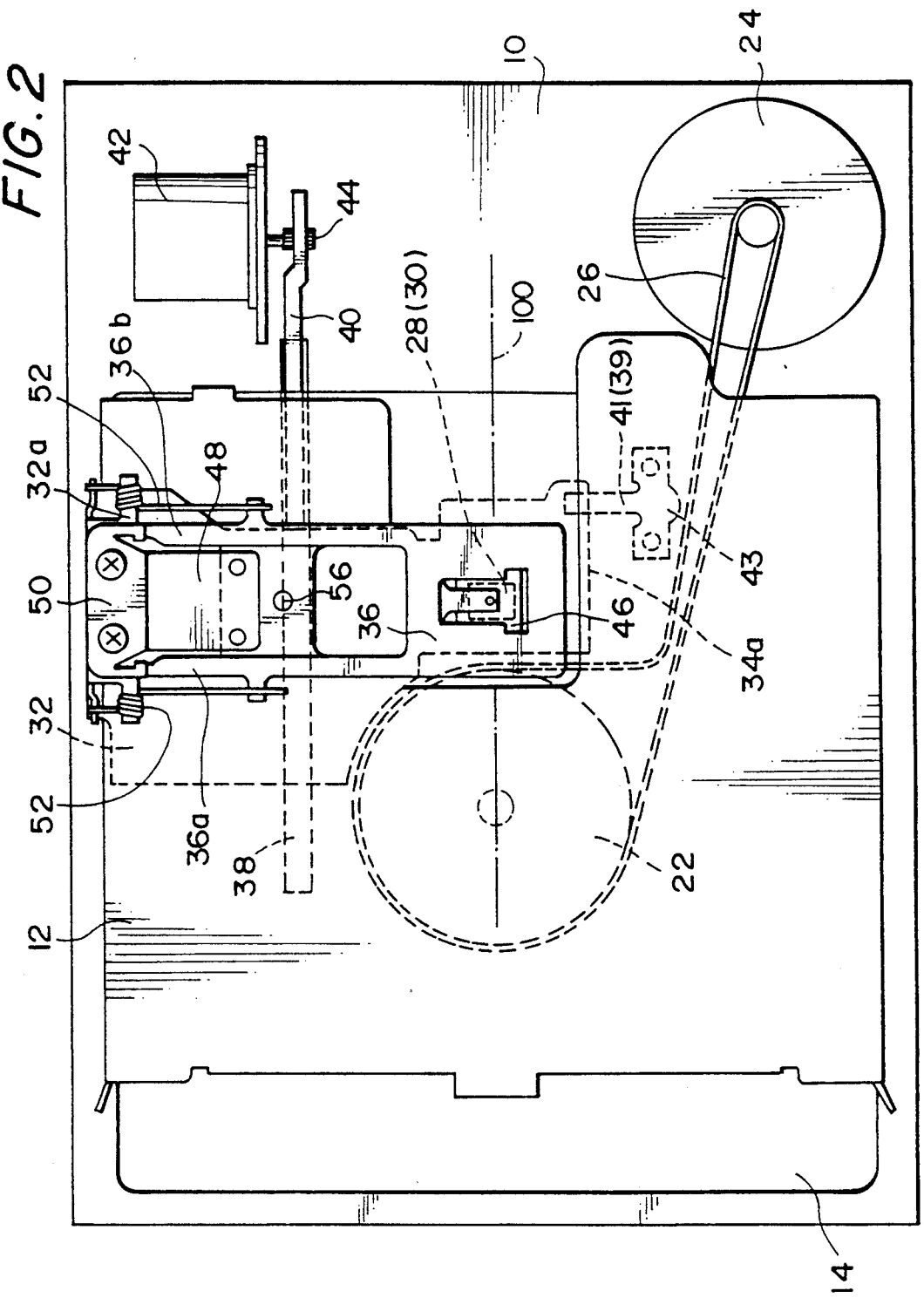
FIG. 2 is a top plan view of the essential section shown in FIG. 1.

FIG. 1 is a cross-sectional view of an essential section of a floppy disk drive incorporating a read/write head carrying mechanism in accordance with an embodiment of the present invention, illustrating a state in which a disk cartridge is inserted in the floppy disk drive in a loaded state. In addition, FIG. 2 is a top plan view of the embodiment, illustrating a state in which the carriage has been moved to the central side of the floppy disk accommodated in the disk cartridge in the loaded state.

As is known, a carrier 12 is provided within a frame 10 in such a manner as to be vertically movable between a loading position and an unloading position The vertical movement of this carrier 12 is controlled by a slide plate and other members, but since this carrier mechanism is conventionally known, a description and detailed illustration thereof will be omitted in this embodiment.

The carrier 12 itself is configured as a frame, and a disk cartridge 14 can be mounted detachably in the interior thereof. The disk cartridge 14 shown in this embodiment is a 3.5 inch-type disk cartridge, and a floppy disk 16 is rotatably accommodated therein, as is well known.

In the illustrated floppy disk loading position, the disk cartridge 14 is positioned by a plurality of reference pins 18, 20 provided on the frame 10.

As shown in FIG. 2, a pulley 22 which rotates integrally with a rotating hub of the floppy disk 16 is disposed rotatably at a substantially central position of the floppy disk drive. A desired rotating force is transmitted to the floppy disk 16 as the pulley 22 is rotated by a spindle motor 24 via a belt 26.

A pair of upper and lower heads are respectively brought into close contact with the both sides of the floppy disk 16, the upper and lower heads being denoted by reference numerals 28 and 30 in the drawings. As is known, these upper and lower heads 28, 30 are required to perform reciprocating movement integrally with each other along a head moving path 100 (FIG. 2) set in the radial direction of the floppy disk 16. In the present invention, an improved read/write head carrying mechanism is provided for moving the upper and lower heads 28, 30.

To effect the aforementioned reciprocating movement along the head moving path 100 while carrying the two heads 28, 30, the lower head 30 is fixedly mounted on one end of the carriage 32 via a lower head-attaching plate 34, while the upper head 28 is secured to an upper arm 36 which is swingably supported by the carriage 32.

The carriage 32 is supported by a guide rail 38 in such a manner as to be slidable and swingable. In the present invention, the guide rail 38 comprises a single guide rail fixed to the frame 10 at a position spaced apart a predetermined distance from and disposed parallel with the head moving path 100. Although not shown in detail, this guide rail 38 is constituted by a round rod with its ends fixedly held by the frame 10 and, in the present invention, serves as a swinging shaft for the carriage 32, which will be described later, thus permitting the swinging open of both the carriage and the upper arm, which is a characteristic feature of the present invention.

In this embodiment the carriage 32 is formed by bending a flat plate and is disposed below the carrier 14. The upper and lower heads 28, 30 are reciprocated along the head moving path 100 via the carriage 32 and the upper arm 36 upon rotation of a feed motor 42 with a rack plate 40 secured to a portion of the carriage 32 meshing with a pinion 44 of the feed motor 42.

As described above, the lower head 30 is secured to a portion of the carriage 32, and, in this embodiment, the lower head 30 is secured to the lower head mounting plate 34 by means of bonding or other similar means via a lower head baseplate 45. The other end of this carriage 32 detours the carrier 12 and extends upwardly, and an end of its upwardly extending portion forms an upper arm-fixing portion 32a.

Meanwhile, the upper arm 36 carries at a distal end thereof the upper head 28 via an upper head baseplate 46, and an upper arm-holding spring 48 constituted by a leaf spring is secured at one end thereof to a proximal end of the upper arm 36. The other end of this upper arm-holding spring 48 extends toward the upper arm-fixing portion 32a and is fixedly secured by an arm holder 50.

Accordingly, the upper arm 36 is swingably supported by the carriage 32 on the upper surface side of the carrier 12.

As is apparent from FIG. 2, ends of a pair of arm legs 36a, 36b provided on lateral sides of the upper arm 36 extend to the upper surface of the upper arm-fixing portion 32a, accurately positioning the upper arm 36 with respect to the carriage 32. In addition, two arm springs 52 held by the upper arm-fixing portion 32a span the carriage 32 and the upper arm 36 and constantly urge the upper arm 36 toward the carriage 32, causing the upper and lower heads 28, 30 to be brought into close contact with the both sides of the floppy disk 16 in a loaded state.

In the present invention, the carriage 32 and the upper arm 36 form a carriage assembly 37, which is pivotally supported by the guide rail 38 in such a manner to be swingable about the swinging shaft constituted by the guide rail 38. A characteristic feature of the present invention lies in that this carriage assembly 37 is disposed with a horizontally uniform balance of weight with the swinging shaft, i.e., the guide rail 38, as a center. For this reason, there is an advantage in that, during an ordinary read/write operation by the upper and lower heads 28, 30 or during an opening operation at the time of loading or unloading of the disk cartridge 14, no error attributable to the gravity occurs in the moving action of the carriage assembly 37.

In the present invention, in order to obtain the aforementioned uniform weight balance, the distribution of weight with the guide rail 38 as a center is calculated at the time of the designing of the carriage and the upper arm. In the illustrated embodiment as well, large overhangs of the carriage 32 and the upper arm 36 are provided on the side of the upper and lower heads 28, 30 which is remote from the side where the guide rail 38 is provided, the weight of the upper and lower heads normally increasing in the manner of a cantilever, thereby obtaining the aforementioned weight balance.

However, in this embodiment, a sufficient weight balance cannot be obtained through such design-wise consideration alone. In the embodiment, therefore, one end of the lower head-attaching plate 34 is extended to form a retaining tongue 34a, and urging forces of balance springs 39, 41 are imparted to this retaining tongue 34a.

One end of each of the balance springs 39, 41 is securely fixed to a spring holder 43 secured to the frame 10, and a free end thereof engages with the retaining tongue 34a.

Accordingly, in the loaded state shown in FIG. 1, the retaining tongue 34a is clamped by the balance springs 39, 41 and assumes a usual horizontal position. In this state, the urging forces of the balance springs 39, 41 are not unidirectionally applied to the carriage assembly 37; however, when the carriage assembly 37 swings about the guide rail 38 due to some cause, the balance springs 39, 41 impart desired returning forces to the carriage assembly 37, so that the carriage assembly 37 is capable of assuming a substantially uniform balance of weight as a whole.

A characteristic feature of the present invention lies in that, when the carrier 12 moves upwardly from the loading position to the unloading position, the upper arm 36 is swung open upwardly and, at the same time, the carriage 32 is swung open downwardly. For this purpose, in the present invention, the carrier 12 is provided with a pushing-up portion, and the pushing-up portion in the embodiment is formed by a carriage pushup spring 54 secured on the upper surface side of the carrier 12. This carriage pushup spring 54 has a substantially L-shaped section, and its long portion is secured on the upper surface of the carrier 12, while its short portion extends to the undersurface side of the upper arm-fixing portion 32a of the carriage 32 in proximity thereto.

Figure 3:
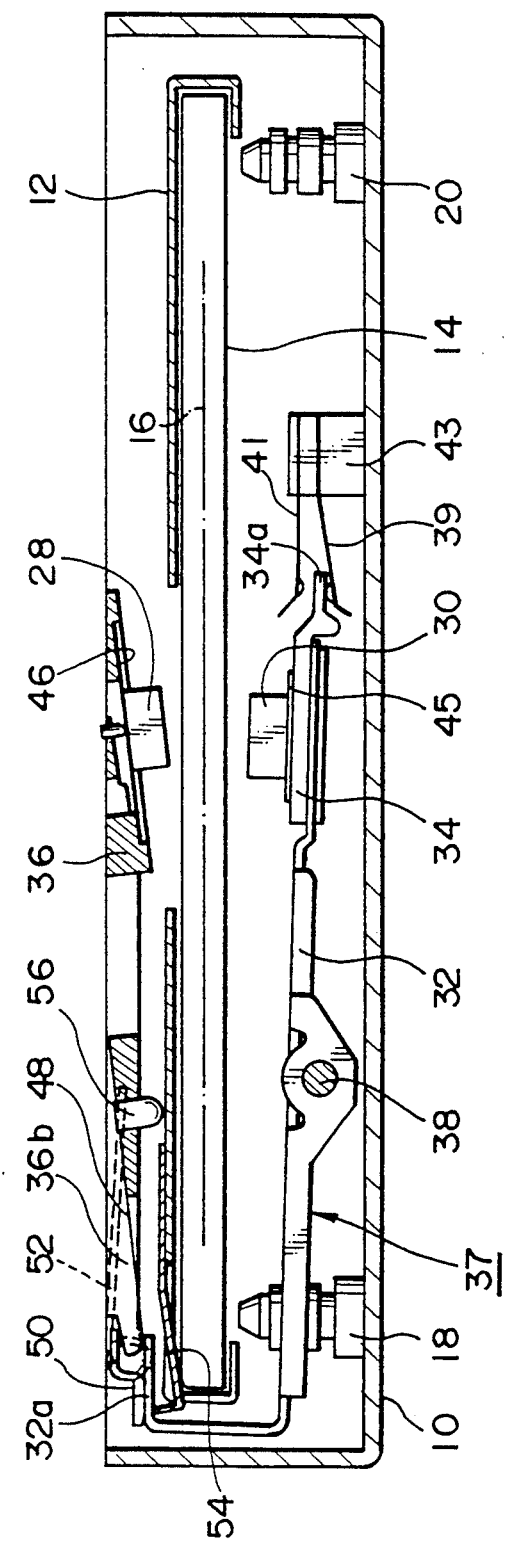
FIG. 3 is a cross-sectional view of the essential section of the read/write head carrying mechanism in an unloaded state.

Accordingly, this pushup spring 54 is capable of pushing the left-hand side of the carriage 32 upwardly, as viewed in FIG. 3, at a position which is on the side of the upper and lower heads 28, 30 which is remote from the side there the guide rail 38 is provided.

In addition, in accordance with this embodiment, the upper arm 36 is provided with a projection 56 for adjusting the height of the upper arm, and, when the carrier 12 moves upwardly to the unloading position, the upper surface of the carrier 12 is brought into direct contact with the projection 56, thereby moving the upper arm 36 upwardly against the resiliency of the arm springs 52.

The embodiment of the present invention is arranged as described above, and its operation will be described hereinunder.

In FIG. 1, since the carriage 32 does not abut against the carriage pushup spring 54, and neither the upper arm 36 abuts against the projection 56 for adjusting the height of the upper arm, an urging force in a closing direction is applied by the arm springs 52 between the carriage 32 and the upper arm 36.

Accordingly, the upper and lower heads 28, 30 are brought into close contact with the upper and lower surfaces of the floppy disk 16 at the illustrated loading position with a predetermined pressure.

Meanwhile, when the disk cartridge 14 is removed from the carrier 12, the carrier 12 moves upwardly from the loading position shown in FIG. 1 toward an unloading position shown in FIG. 3, as is known. During the unloading of the disk cartridge 14 at this unloading position, the upper and lower heads 28, 30 must move away from the floppy disk 16 and must be retracted from an unloading area for the disk cartridge 14.

Conventionally, the disk cartridge 14 moves upwardly and thereby moves away from the lower head 30, and at that juncture only the upper head 28 is swung open upwardly, thereby forming the unloading area for the disk cartridge 14. With such a conventional apparatus, however, there is the problem that the distance of upward movement of the disk cartridge 14 must be made large, so that there has been a drawback in that the thickness of the floppy disk increases.

The present invention is aimed at overcoming this conventional drawback, and, as is apparent from FIG. 3, the carriage pushup spring 54 first pushes the upward arm-fixing portion 32a of the carriage 32 during the upward movement of the carrier 12. Subsequently, the carrier 12 itself is brought into contact with the projection 56 for adjusting the height of the upper arm, thereby pushing the same upwardly.

As is apparent from the unloading position shown in FIG. 3, the pushing up of the carriage 32 by the carriage pushup spring 54 causes the carriage 32 to swing clockwise, as viewed in the drawing, with the guide rail 38 serving as a fulcrum.

In the drawing, when the carriage 32 is swung open downwardly, the retaining tongue 34 pushes down the lower balance spring 39, as shown in the drawing, and a balancing force at this time applies an urging force for returning the carriage 32 upwardly.

As the left-hand side of the carriage 32, as viewed in FIG. 3, is thus pushed upwardly, the lower head 30 retracts downwardly from the loading position shown in FIG. 1. Hence, a space sufficient for unloading the carrier 12 is created by the portion of this retraction without the disk cartridge 14 coming into collision with the lower head 30 even if the amount of upward movement of the carrier 12 decreases.

It goes without saying that, at this juncture, the upper arm 36 is swung open upwardly as the projection 56 for adjusting the height of the upper arm comes into contact with the carrier 12, as described above, and the upper head 28 can retract sufficiently from the disk cartridge 14 in the same way as the prior art.

Therefore, in accordance with the present invention, there is an advantage in that, by virtue of the swinging open of the two heads 28, 30, a space sufficient for unloading the disk cartridge 14 can be created while the amount of upward movement of the carrier 12 is reduced.

Although in the above-described embodiment, a resilient carriage pushup spring 54 is used for moving the left-hand side of the carriage 32 upwardly, as viewed in the drawing, and moving the lower head 30 downwardly, it goes without saying that, in the present invention, this carriage pushup portion can be provided with another arbitrary configuration. In addition, this pushup portion may be arranged such that the upper arm 36 is directly pushed upwardly by the pushup portion, and this pushing force may be used as it is so as to swing the carriage 32.

For this purpose, in accordance with the present invention, the pushup portion is provided on the side of the upper and lower heads 28, 30 which is remote from the side where the guide rail 38 is provided.

As described above, since the carriage assembly 37 in accordance with the present invention is arranged such that, in consideration of the distribution of its weight in design and, by virtue of urging forces of balance springs, the weight balance of the carriage assembly 37 between the left- and right-hand sides of the guide rail 38 is arranged to be substantially uniform with the guide rail 38 serving as a swinging shaft. Accordingly, there is the advantage that the posture of the carriage assembly 37 during movement thereof can be maintained in a stable state.

As described above, in accordance with the present invention, at the time of unloading a disk cartridge, the carrier causes the right-hand side of carriage, as viewed in FIG. 3, to swing open downwardly and the upper arm upwardly. Consequently, the disk cartridge can move away from the upper and lower heads by virtue of this opening operation in the two directions, and the amount of movement of the carrier from the loading position to the unloading position can be reduced. Accordingly, there is the advantage in that the thickness of the floppy disk drive can be made small without any need to provide a large extra vacant space within the frame of the floppy disk drive.

In addition, since the carriage assembly in accordance with the present invention is provided with a substantially uniform weight balance on the left- and the right-hand sides of its swinging shaft, there is an advantage in that no extra external force is applied to the movement of the carriage and the upper arm during a swinging or read/write operation.

What is claimed is:

1. A read/write head carrying mechanism, including a carrier in which a disk cartridge accommodating a floppy disk is detachably loaded, said carrier being capable of assuming a loading position and an unloading position in accordance with the vertical movement thereof, and in said loading position upper and a lower heads are in close contact with both surfaces of the floppy disk and integrally slide along a head moving path established in the radial direction of the floppy disk, said read/write head carrying mechanism comprising:
   a guide rail secured to a frame in parallel to the head moving path with a predetermined distance there between;
   a carriage, disposed below said carrier and supported slidably and swingably by said guide rail, on which said lower head is mounted, said carriage having one end extending along one side and an upper side of said carrier;
   an upper arm, swingably supported by said one end of said carriage and extending over the upper surface of said carrier, and to which said upper head is secured;
   a pushup means mounted on the upper surface of said carrier, said pushup means coming to contact with a portion of the carriage connected to the upper arm and causes said carriage to swing open downwardly at a position opposite to both heads with said guide rail as a fulcrum therebetween.

2. A read/write head carrying mechanism according to claim 1, further comprising:
   a pulley for driving a rotating hub of the floppy disk in a loaded state by being engaged with said rotating hub, said pulley being provided rotatably on said frame;
   a spindle motor secured to said frame at a position spaced apart from said carrier adapted to move vertically between the loading position and the unloading position; and
   a belt for transmitting the rotation of said spindle motor to said pulley.

3. A read/write head carrying mechanism according to claim 1, wherein said carriage is formed by bending a flat plate.

4. A read/write head carrying mechanism according to claim 1, further comprising:
   a feed motor secured to said frame at a position spaced apart from a moving area of said carrier and including a pinion provided on a main spindle thereof;
   a rack plate provided on a part of said carriage and adapted to reciprocate said upper and lower heads along said head moving path via said carriage and said upper arm upon rotation of said feed motor as said rack plate engages with said pinion.

5. A read/write head carrying mechanism according to claim 1, wherein an end portion of said carriage which is opposite to the other end thereof where said lower head is provided, extends along the same end of the carrier and toward the upper arm side in an L-shaped configuration, an end of said end portion forming an upper arm-fixing portion.

6. A read/write head carrying mechanism according to claim 5, further comprising:
   an upper arm-holding spring which is constituted by a leaf spring and one end of which is secured to said upper arm-fixing portion, the other end of said upper arm-holding spring being secured to a proximal end of said upper arm for supporting said upper arm;
   a pair of arm legs respectively provided on lateral sides of said upper arm, tips of said arm legs extending toward the upper surface of said upper arm-fixing portion so as to be brought into contact with said fixing portion; and
   at least one arm spring held by said arm-fixing portion, one end of said arm spring abutting against said upper arm, thereby urging said upper arm toward said carriage.

7. A read/write head carrying mechanism according to claim 1, wherein said carriage, carrying said lower head and said upper arm carrying said upper head integrally composed a carriage assembly, and said carriage assembly has a substantially uniform weight balance with said guide rail serving as a swinging shaft.

8. A read/write head carrying mechanism according to claim 7, further comprising:
   an attaching plate for fixing said lower head to said carriage;
   a retaining tongue piece provided by extending an end of said attaching plate;
   a balance spring secured to said frame and having a free end that engages with said retaining tongue, whereby the weight balance of said carriage assembly is adjusted by the urging force of said balance spring.

9. A read/write head carrying mechanism according to claim 8, wherein said balance spring is formed into a U-shaped configuration, and, in the loaded state of said carrier, said retaining tongue is clamped by opposing portions of said balance spring and assumes a horizontal position in which said retaining tongue is subjected to substantially no unidirectionally resilient force of said balancing spring, whereby said carriage assembly is set in a balanced state.

10. A read/write head carrying mechanism according to claim 1, wherein said pushup portion is formed by a carriage pushup spring secured to the upper surface of said carrier, one end thereof being adapted to push said carriage upwardly when said carrier moves from the loading position to the unloading position.

11. A read/write head carrying mechanism according to claim 10, wherein said carriage pushup spring has a substantially L-shaped configuration, and the long portion push up spring is secured to the upper surface of said carrier, while its short portion is disposed in proximity to the undersurface side of said upper arm-fixing portion.

12. A read/write head carrying mechanism according to claim 1, further comprising:
a projection for adjusting the height of said upper arm, said projection being provided on said upper arm and being capable of coming into contact with the upper surface of said carrier.

* * * * *